(12) United States Patent
Liners et al.

(10) Patent No.: US 8,297,113 B2
(45) Date of Patent: Oct. 30, 2012

(54) MEDIA CERTIFICATION DEVICE DESIGN

(75) Inventors: William Omar Liners, Minnetonka, MN (US); Mallika Roy, Edina, MN (US); Francis Anthony McGinnity, Eglinton (GB); Gavin Lee Brinkley, Killea (IE)

(73) Assignee: Seagate Technology LLC, Scotts Valley, CA (US)

( * ) Notice: Subject to any disclaimer, the term of this patent is extended or adjusted under 35 U.S.C. 154(b) by 436 days.

(21) Appl. No.: 12/405,070

(22) Filed: Mar. 16, 2009

(65) Prior Publication Data

US 2010/0232067 A1    Sep. 16, 2010

(51) Int. Cl.
    *G11B 5/127* (2006.01)
(52) U.S. Cl. ............. 73/104; 360/234.3; 73/105
(58) Field of Classification Search ............ None
    See application file for complete search history.

(56) References Cited

U.S. PATENT DOCUMENTS

| | | |
|---|---|---|
| 5,527,110 A | 6/1996 | Abraham et al. |
| 5,808,184 A | 9/1998 | Boutaghou et al. |
| 5,991,113 A | 11/1999 | Meyer et al. |
| 5,999,360 A | 12/1999 | Meyer et al. |
| 6,003,364 A | 12/1999 | Yao et al. |
| 6,016,692 A | 1/2000 | Schaenzer et al. |
| 6,023,963 A | 2/2000 | Schaenzer et al. |
| 6,071,007 A | 6/2000 | Schaenzer et al. |
| 6,163,434 A * | 12/2000 | Zhang ............ 360/294.5 |
| 6,185,993 B1 | 2/2001 | Schaenzer et al. |
| 6,196,062 B1 | 3/2001 | Wright et al. |
| 6,262,572 B1 | 7/2001 | Franco et al. |
| 6,338,269 B1 | 1/2002 | Burga et al. |
| 6,570,730 B1 | 5/2003 | Lewis et al. |
| 6,611,401 B1 | 8/2003 | Burga et al. |
| 6,623,158 B2 | 9/2003 | Abraham et al. |
| 6,628,465 B2 | 9/2003 | Yong |
| 6,765,379 B1 | 7/2004 | Marshall et al. |
| 6,899,456 B2 * | 5/2005 | Sundaram et al. ........ 374/4 |
| 6,956,707 B2 | 10/2005 | Ottesen et al. |
| 6,967,805 B1 | 11/2005 | Hanchi et al. |
| 6,985,326 B2 | 1/2006 | Zhu et al. |
| 7,124,625 B1 | 10/2006 | Kurita et al. |
| 7,206,150 B2 | 4/2007 | Koshkina et al. |
| 2003/0165031 A1 | 9/2003 | Rajakumar |
| 2008/0007871 A1* | 1/2008 | Kiyono et al. ........ 360/235.4 |
| 2008/0239581 A1* | 10/2008 | Ikai et al. ........... 360/272 |

* cited by examiner

*Primary Examiner* — Hezron E Williams
*Assistant Examiner* — Mark A Shabman
(74) *Attorney, Agent, or Firm* — Kagan Binder, PLLC

(57) ABSTRACT

A glide head with a slider body that has a leading edge, a trailing edge and an air bearing surface is disclosed. The glide head also has an array of thermal proximity sensing elements connected in a bridge circuit that are adjacent both the trailing edge and the air bearing surface, a heating element mounted to the glide body for elevating the temperature of the thermal proximity sensing elements in relation to the temperature of an inspected surface, and a controller coupled to the array of thermal proximity sensing elements. The controller receives signals from the thermal proximity sensing elements, and determines the existence of a surface variation in the inspected surface based upon differences in the signals received from the thermal proximity sensing elements.

10 Claims, 5 Drawing Sheets

MEDIA CERTIFICATION DEVICE DESIGN

BACKGROUND

In data processing systems, magnetic disc drives are often used as direct access storage devices. In such devices, read/write heads are used to write data on or read data from an adjacently rotating hard or flexible disk. To prevent damage to either the disc or the read/write head, it has been recognized that the surface of the disc should be very flat and free of any bumps or the like which might be contacted by the read/write head. Also, the read/write heads have been designed so that they will fly over the surface of the rotating disc with a small fly height which is maintained by a film of air. During its flight, the head undergoes continuous vibration, pitch and roll as the topography of the disc changes beneath the head. If the quality of the disc or the read/write head is poor, occasional rubbing or sharp contact may occur between the disc and the read/write head. Such contact may damage the head or the disc, cause loss of valuable data, or all of these.

In order to certify that a magnetic disc is adequately smooth for use in a disc drive system, glide height tests must be performed on the disc. Glide height testing is used to verify that a magnetic recording disc is able to accommodate a specified glide height. As the density of data recorded on magnetic discs continues to increase, the flying height or glide height of magnetic transducers with respect to the disc must be reduced to accurately read and write information on the disc. As a result, the magnetic recording disc must accommodate the lower glide height of the transducer and the slider supporting it, meaning that the disc surface must be extremely smooth and uniform.

Since glide head technology relies on direct contact with a defect in order to function, the range of detectable defect sizes (or defect bandwidth) is limited by the design of the probing structure. Glide heads designed to detect large defects (macro-defects) generally can not detect nano-defects, while those designed to detect nano-defects are at risk of damage by large, catastrophic defects. In addition, more stringent requirements exist for testing the extreme inner and outer radii of the media. Probing technology must be able to function on these areas as well.

Media certification designs incorporate a wide contact area on the air bearing topographical surface. The detection pad may be minimally on the order of 8 to 10 mils wide in order to accommodate an adequate track step size, which is required for production throughput. If multiple contact pads are integrated into the design for inner diameter/outer diameter access, then there is no way to determine which pad is excited, and thus the defect event can be anywhere within the entire slider width. This leaves great uncertainty as to the precise location of defects, and can result in large areas of the media being labeled as defect zones rather than precise locations. This leads to lower data storage capacity of the media than may in fact be available.

There is also a physical limit to glide head capability to resolve smaller defects. Although the surface is wide and durable, very small defects fail to significantly induce slider body modes required to excite ex situ or sensor attached configurations. As the requirement to detect micro and nano-defects comes into play, these even become more of an issue.

SUMMARY

A glide head with a slider has a leading edge, a trailing edge and an air bearing surface. The glide head also has an array of thermal proximity sensing elements connected in a bridge circuit adjacent both the trailing edge and the air bearing surface, a heating element for elevating the temperature of the thermal proximity sensing elements in relation to the temperature of an inspected surface, and a controller. The controller receives signals from the thermal proximity sensing elements, and determines the existence of a surface variation in the inspected surface.

An apparatus for detecting surface variations in recordable magnetic media includes a slider body configured to fly over the recordable magnetic media. The apparatus includes a suspension assembly coupled to the slider body configured to support the slider above the recordable magnetic media, a plurality of thermal proximity sensing elements adjacent both a trailing edge and the air bearing surface; and a controller coupled to the thermal proximity sensing elements. The controller receives signals from the thermal proximity sensing elements, and determines the existence of a surface variation in the media based upon differences in the signals received.

A method of locating surface variations on a recordable magnetic media includes flying a slide head above the disc. The slide head has an array of thermal proximity sensing elements adjacent a trailing edge of the slide head at an ambient temperature. Signals from the proximity sensing elements representative of a change in temperature due to proximity to a surface variation encountered while flying the slide head are received, and the existence of the surface variation on the disc is determined based on the change in temperature encountered by the array of thermal proximity sensing elements.

DETAILED DESCRIPTION

By placing a thermal sensor as a defect/asperity sensor on the air bearing surface of a slider/glide head, glide testing can be performed efficiently with a high sensitivity. After a defect strikes the thermal sensor, a resistance spike is detected to provide a signature that a defect has contacted the glide head. Furthermore, thermal sensors oriented along the air bearing surface can present a large contact area on the air bearing surface. Thus, a glide test can be performed efficiently since asperities with a greater range of heights strike the thermal sensor when contacting the glide head. A plurality of thermal sensors on the air bearing surface can be used to assess the distribution of defect heights.

The thermal sensors are made from materials that alter their electrical resistance in response to a temperature change. To complete the asperity detector, the thermal sensor is connected to a circuit that provides for the measurement of the electrical resistance of the material in the sensor adjacent the air bearing surface. To form the electrical circuit, electrical conducting pads can be placed on the slider to connect electrically the air bearing surface with another portion, such as the top surface, of the slider. A particular thermal sensor is connected to two electrical pads to form a circuit through the sensor. The electrical circuit for resistance measurement is completed with connections to the electrical pads of the slider body.

The air bearing surface of the slider generally includes contoured portions such as rails for aerodynamic performance. The thermal sensors generally are placed adjacent to an extended portion of the surface such that they will provide the point of contact with an asperity. A single large sensor can provide for defect detection over a larger range of defect heights. The use of multiple thermal sensing elements can provide for grading of asperities, as described further below. Thus, selection of the number and placement of the thermal sensing elements involves a balance between the processing complexity and the amount of information desired about the nature of the asperities.

Figure 1:
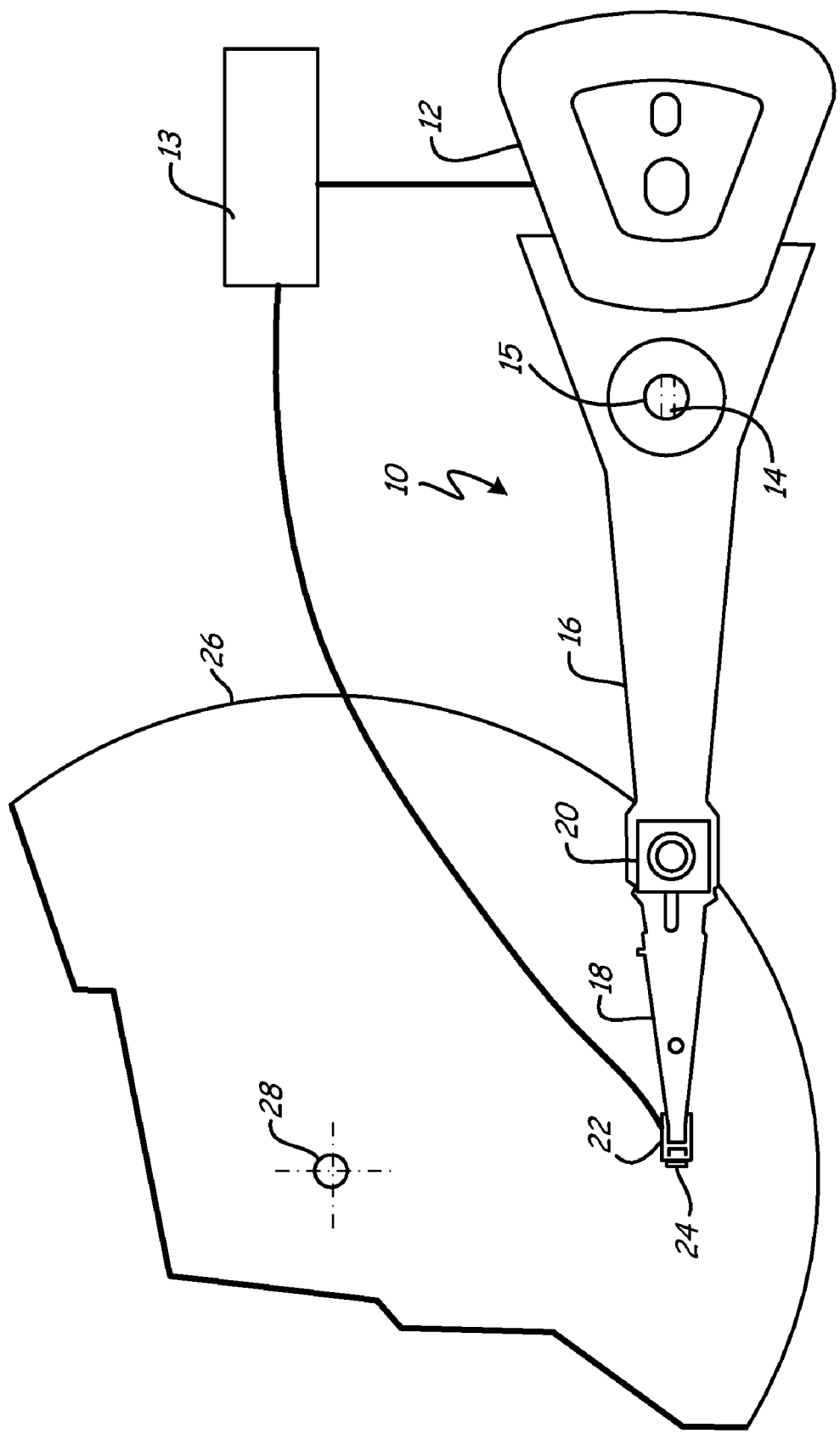
FIG. 1 is a plan view of a disc drive system for supporting a slider/glide head over the surface of a disc.

FIG. 1 is a top plan view of disc test system 10 supporting slider 24 over the surface of disc 26. Test system 10 includes actuator motor 12 arranged to rotate actuator arm 16 around axis 14 on support spindle 15. Suspension 18 is connected to actuator arm 16 at mounting block 20. Flexure 22 is connected to an end of suspension 18, and carries slider 24 to form a head gimbal assembly. Disc 26 rotates around axis 28. The rotation of disc 26 creates flow to create an air bearing between disc 26 and slider 24. Disc 26 may be a magnetic recordable media. Motor 12 is connected to controller 13, which is also connected to slider 24. Controller 13 correlates the position of arm 16 with the rotational speed of disc 26 to maintain an approximately constant angular speed of slider 24 relative to the surface of disc 26. Slider 24 is a glide body that includes an element (not shown in FIG. 1) for sensing asperities and irregularities on the surface of disc 26. Controller 13 maps information received from the sensor with respect to the disc surface and transmits an output signal to any suitable device through an appropriate communication link.

Figure 2:
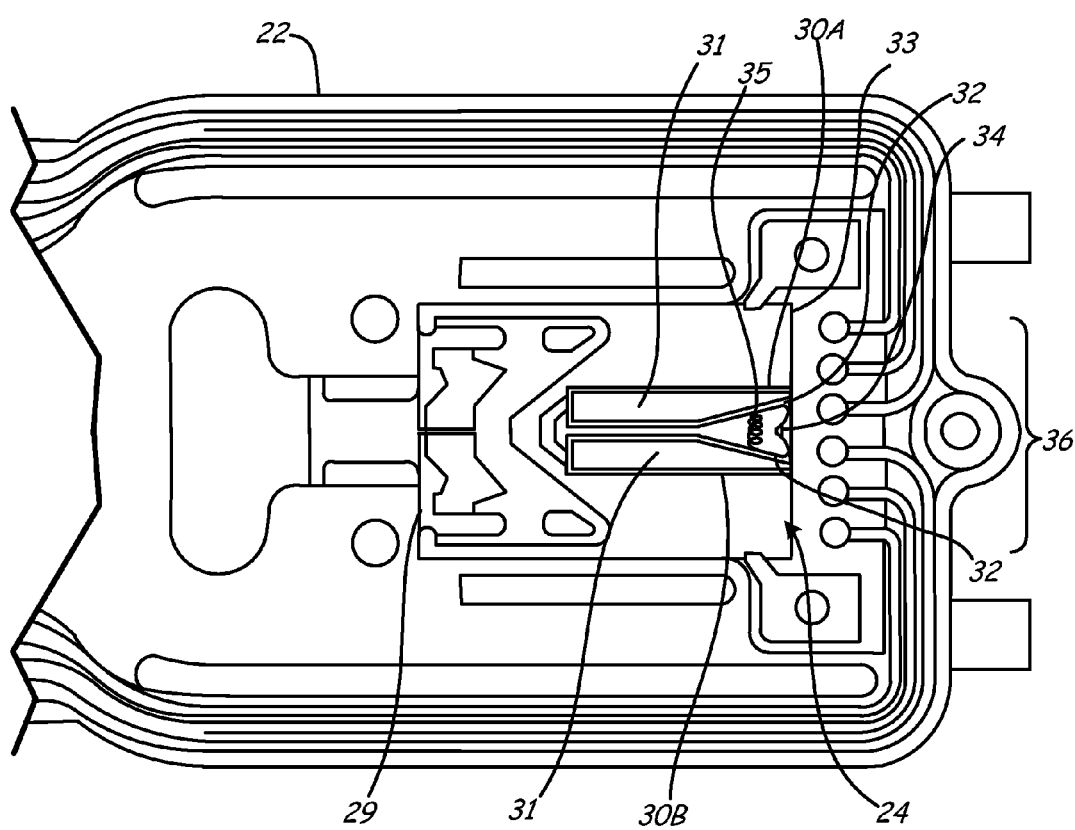
FIG. 2 is a bottom plan view of slider.

FIG. 2 is a bottom plan view showing flexure 22 with slider 24 and associated wiring 36, which is composed of contact pads and the associated wires. Slider 24 includes a leading edge 29 and trailing edge 33. Slider 24 is an up head design that also contains inner rail 30A, outer rail 30B, and pad 32 that extend vertically from bottom surface 31. Inner rail 30A, outer rail 30B, and pad 32 have an air-bearing surface on their respective bottom surfaces that generates lift for slider 24 as slider 24 flies above disc 26. The geometry of pad 32 and rails 30A and 30B forms a rectangle, however in other aspects rails 30A and 30B create an advanced air bearing topography with other permissible geometries. The topographical pattern created by pad 32 and rails 30A and 30B allows for precise control of the fly height and altitude of slider 24 with respect to the spinning disc 26. Pad 32 has sensor 34 mounted therein adjacent the trailing edge 33.

As shown in FIG. 2, slider 24 also contains heating element 35. Heating element 35 transfers energy to sensor 34, and may be mounted in at a variety of locations. Heating element 35 may be positioned to minimize its influence on the aerodynamic properties of slider 24. Heat is generated in an amount that varies with the current through heating element 35. Controller 13 adjusts and varies the amount of current through heating element 35, and thus the amount of heat generated and provided to each sensing element. Heating element 35 is connected to controller through a portion of the plurality of wires of wiring 36. Any number of heating elements 35 can be arrayed across slider 24, including placing heating elements 35 adjacent trailing edge 33 of slider 24.

Figure 3:
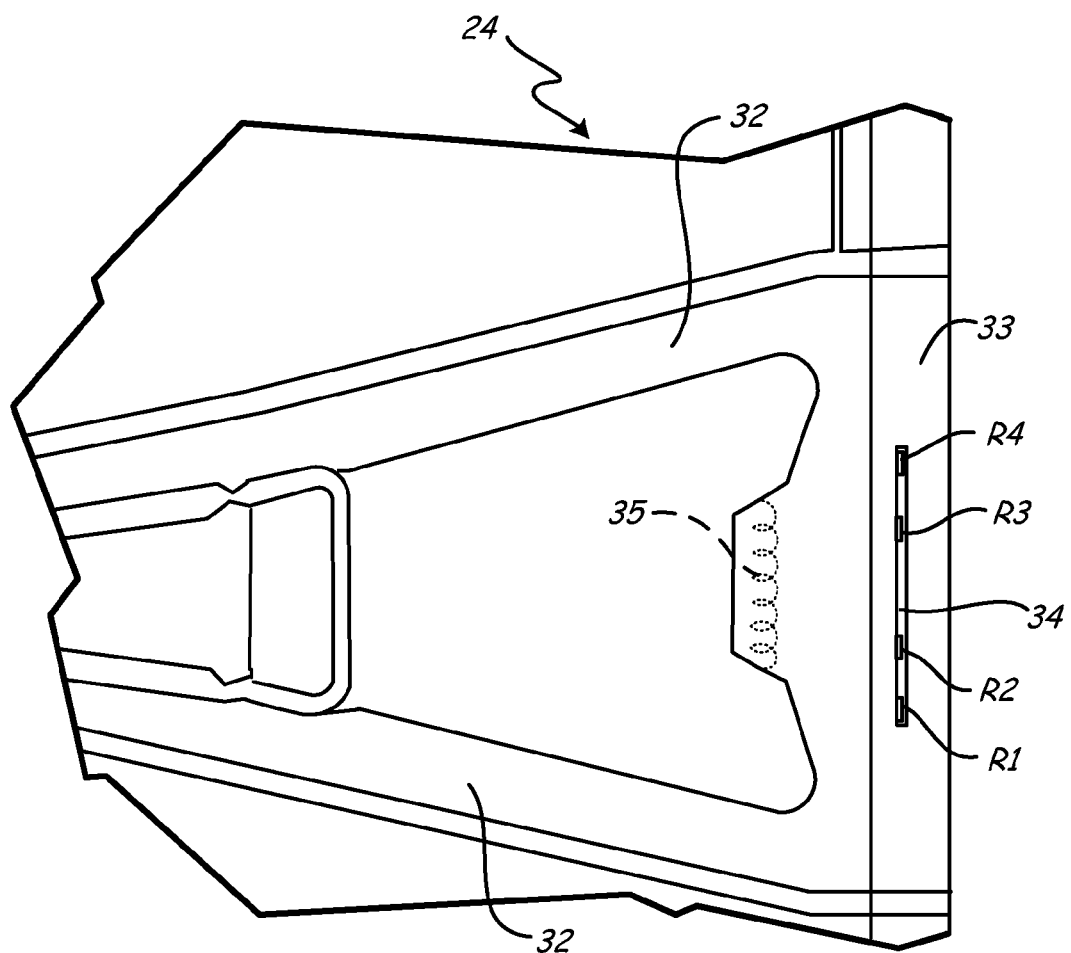
FIG. 3 is a bottom perspective view of a portion of the slider with a sensor.

FIG. 3 is a partial perspective view of slider 24 illustrating trailing edge 33 and sensor 34 on pad 32. Sensor 34 contains several sensing elements R1-R4 in an array on trailing edge 33 of slider 24, adjacent the air bearing surface of pad 32. This results in a multi-channel glide head probe design for slider 24. Each sensing element R1-R4 is an individual thermal proximity sensor that has a resistance that varies as a function of temperature, such as a resistive temperature detector or thermistor. Sensor 34 may contain additional sensing elements based on the testing needs of the media being inspected and certified.

Figure 4:
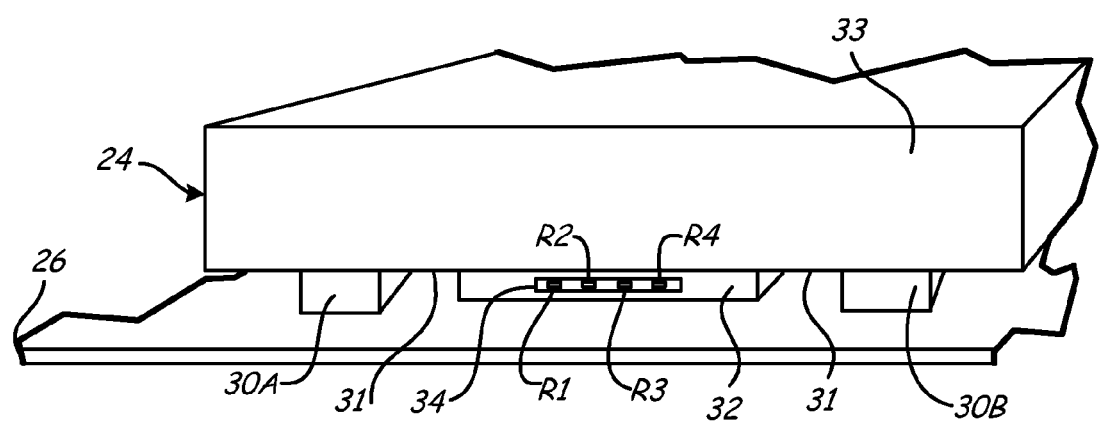
FIG. 4 is a perspective view of the slider over the disc.

FIG. 4 is a perspective view of trailing edge 33 of slider 24 over disc 26. Slider 24 has inner and outer rails 30A and 30B, respectively, and pad 32 with sensor 34 extending laterally from bottom surface 31 of slider 24. Sensor 34 has sensing elements R1-R4, which may be metallic wires, and may be constructed from tungsten, platinum, or similar metal with a high thermal coefficient of resistivity. Again, the number of sensing elements may vary based upon the testing needs of the media being certified.

Figure 5:
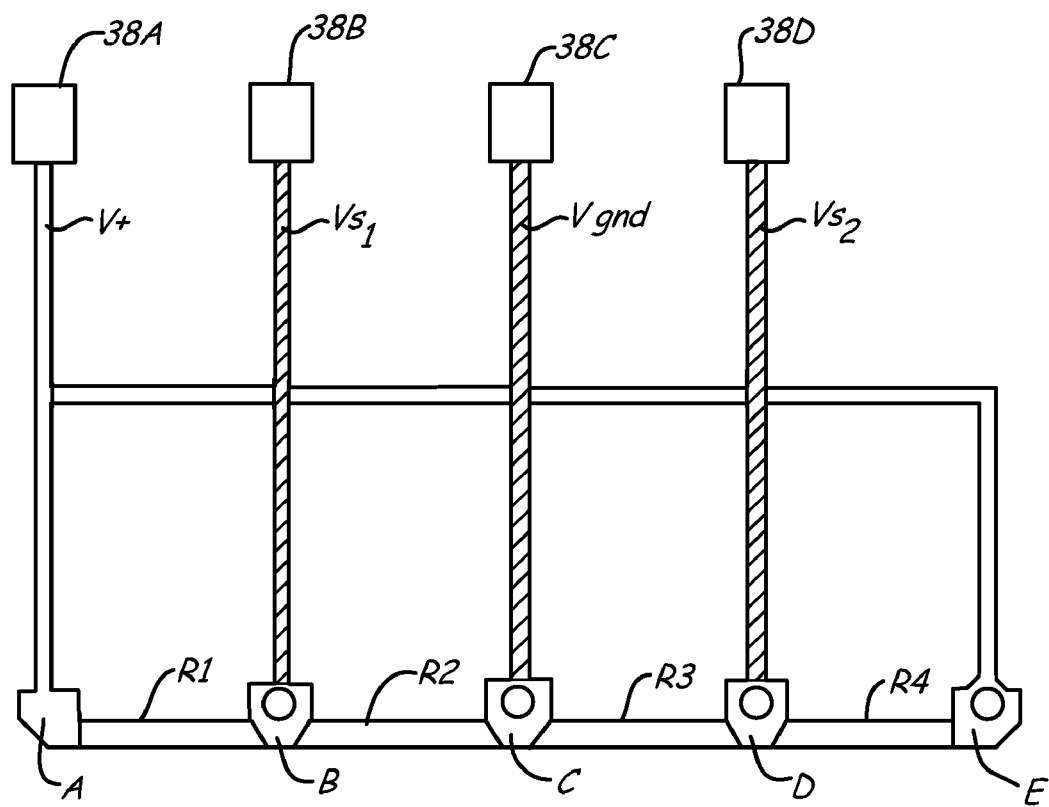
FIG. 5 is a schematic view illustrating one aspect of a circuit for the sensor.

FIG. 5 is a schematic of one aspect of a sensing circuit for sensor 34 with four resistors R1-R4. Resistors R1 and R3 may be contained on a first conducting layer, and resistors R3 and R4, may be contained in a second conducting layer with these two layers separated by an insulator layer; the insulator layer being perforated for the purpose of electrical connection between conducting layers at points B, C and D. Resistors R1-R4 are wired together in a wheatstone bridge circuit configuration. The circuit contains the four resistances, a constant voltage input, and a voltage gage.

The four resistors R1-R4 are connected at contacts A-E. A voltage is applied to V+ through pad 38A, which is connected to contacts A and E between resistors R1 and R4. Contacts A and E may be the same physical junction between R1 and R4. A ground pad 38C, has a lead represented by Vgnd, joining contact C between R2 and R3. Two output pads 38B and 38D contain leads Vs that join contact B between R1 and R2 and contact D between R3 and R4. If R1=R2=R3=R4=R; this leads to:

$$\Delta V_s \approx \Delta R_1 - \Delta R_2 + \Delta R_3 - \Delta R_4 / 4R \, V_{in}$$

Where $V_{in} = V + - V_{gnd}$ and $V_g = V_{S1} - V_{S2}$

Referring to FIG. 5, a supply voltage is applied between V+ and Vgnd. The signal voltage between output pads $V_{S1}$ and $V_{S2}$ will have a small DC component resulting from bridge imbalance, but independent of ambient temperature. The AC signal of interest arises from a difference in resistance between the four resistors R1-R4 (the change in Vg in the above equation). The difference in the resistance is obtained by comparing $V_{S1}$ and $V_{S2}$. Theoretically, identical resistance changes seen simultaneously by corresponding resistor pairs, (R1/R3 and R2/R4), will cancel. However, in a sparse media defect environment, the probability of this is negligible.

In practice, if the same nominal resistance is used for all four resistors (R1=R2=R3=R4=R), the wheatstone bridge circuit can amplify small changes in resistance and/or compensate for changes in temperature. With this arrangement, only three contact pads are required to monitor four side-by-side resistors. One of the four pads nominally required may be common with the ground pad. Reducing the number of contact pads, and thus the number of electrical contacts, reduces the size of the slider. The contact pads are the largest structure in the wafer. That is, the size of a wafer level slider is controlled by the number of electrical connections and contact pads that it must carry, so fewer connections result in a smaller structure compared to the wiring schematics of the same number of individual sensors. Resistors R1-R4 are insensitive to the spacing between the two resistor layers. The material used for the sensor element will be selected based upon its corrosion resistance, thermal conductivity and temperature coefficient of resistance. One suitable material is tungsten.

In operation, as slider 24 flies above the media, such as disc 26 in FIGS. 1 and 4, the four identical sensing elements R1-R4 are heated directly by the sensor supply current, and/or to a steady state temperature by heating element 35, defined by a thermal balance between the heat supplied and the heat flowing out through the air bearing surface, which is the bottom surface of pad 32. The rate of heat flow from the air bearing surface is governed by the local air static temperature at the slider/disc interface. This static temperature is governed by a number of factors including the ambient temperature and the global head/media spacing (HMS). Although there is a fixed nominal HMS, the spacing is subject to some modulation about the target value and this gives rise to some local air velocity change within the air bearing and consequent static temperature change. This in turn affects the sensor temperature which is the network resistance between the supply terminals denoted. V+ and Vgnd in FIG. 5. This temperature change will not be detected at the signal terminals $V_{S1}$ and $V_{S2}$, since all four elements will be affected equally. Similarly, other global sources of temperature variation will not affect the signal of interest. Thus, common mode (ambient) temperature changes do not affect the signal when sensor 34 and sensing elements R1-R4 encounter a media defect on disc 26. Sensor 34 is designed either to be self heating, or to be heated by heating element 35 as illustrated in FIGS. 1 and 3, allowing sensing elements R1-R4 to be operated at a higher than ambient temperature in order to optimize the sensitivity to HMS. Heating the sensing elements R1-R4 extends active sensor elements within the wafer, which protrude towards disc 26.

In thermal asperity detection embodiment of the invention, wherein the controller 13 has additional inputs defining the radial and angular position of the slider 24 on the disc 26, as slider 24 flies above disc 26, an asperity may be encountered by one of the sensing elements R1-R4. This will result in a different signal from the sensor encountering the asperity. Controller 13 receives signals from the sensing elements R1-R4, and determines the position of the asperity on disc 26 based upon timing of the signal received and the slider positional information. Controller 13 can then correlate the asperity and map the surface of disc 26.

The multi-channel thermal proximity sensor as described above only requires a simple pre-amp circuit and minimal signal analysis. Multi-channel operation, through the use of an array of sensing elements R1-R4 at trailing edge 33 adjacent the air bearing surface of slider 24, is viable and inexpensive. Incorporation into existing testers requires very little system upgrade. Furthermore, there is little or no interference between adjacent thermal proximity sensor wires of sensing elements R1-R4 so defects can easily be localized as well. The thermal proximity sensor allows for excellent spatial resolution while enabling a large area to be simultaneously scanned. Thus, an array of sensing elements such as R1-R4 combines the sensitivity provided by a small sensor with the scanning speed of provided by a large sensor.

In addition to the precise detection capability, a thermal proximity sensor structure or an array of sensing elements R1-R4 incorporated into a single slider body offers significant mechanical performance improvement over ex-situ and sensor-attached test glide head configurations. The wafer level alternative described herein is more conducive to standard head gimbal assembly assembling processes as well. The thermal proximity sensor adds no appreciable mass to the slider and, in addition, does not require a "sensor shelf" machined into the slider body.

The location of the thermal proximity sensor adjacent trailing edge 33 does not inhibit slider flatness control processes, which in turn may perturb fly performance. Since the thermal proximity sensor wire of the sensing elements R1-R4 is incorporated into the slider trailing edge where contact occurs, it does not suffer signal degradation. Finally, wafer level thermal proximity sensing allows direct slider-to-contact pad bonding to gimbal trace suspension designs of a disc apparatus.

Sensor 34 is manufactured using thin film construction. Thin film construction method is based directly upon the thin film disc drive recording head methods and material set. Specifically, it requires two resistance layers, separated by a thin insulator layer. At its simplest, these are the only layers required for functionality. However in order to facilitate practical application, a number of additional features may be required in order to facilitate post-wafer manufacture of the sensor. These include machining and assembly fiducials, lap guides and an alumina overcoat as required to enable post-wafer slider and head gimbal assembly processing. Additional contact layers to minimize nonactive resistance may be added. In the slider process, the sensing elements are exposed by lapping using a magnetoresistive head process.

Thin film patterning lithography can be employed to place sensing elements R1-R4 in close proximity to advanced air bearing topographical detection features on the air bearing slider surface, such as those made from AlTiC. Individual inner diameter, outer diameter, and mid-diameter air bearing surface trailing edge pads can also contain thermal proximity sensing wire arrays as well (such as rails 30A and 30B of FIG. 4). The thermal proximity sensors may be placed anywhere on pad 32, or alternatively adjacent trailing edge 33 anywhere between inner rail 30A and outer rail 30B. Since the thermal proximity sensor 34 preferentially detects defects in close proximity, contact events can be resolved independently by employing a multi-channel tester configuration in order to accurately and specifically probe radial extremes. In this configuration, defect locations can be accurately identified and characterized in the various extreme media zones.

Employing thermal proximity sensing technology at the slider wafer level offers flexible design options, which allow the head to operate in both the micro and nano-defect regime while maintaining robustness to macrodefects as well as strategically placing the sensor or sensors close to the probing structures. Sensor 34 can distinguish not only between different types of defects, but can also be calibrated to measure the height and the width of the defects/asperities.

Incorporation of heater structures near the thermal proximity sensing wires of sensing elements R1-R4 allow sensor 34 to be protruded or retracted on demand. In the retracted or "passive" mode, contact occurs with the robust AlTiC advanced air bearing features and can withstand macro-defect collisions without damage to the softer sensor structures in layers at trailing edge 33, which can be recessed from the plane of the advanced air bearing surface through slider lapping processes. The thermal proximity sensing wires of sensing elements R1-R4 are still capable of sensing the contact induced thermal event. Additional details of this process are contained within commonly assigned U.S. Pat. No. 5,991,113.

Once the media is scanned for macro and other catastrophic defects, the thermal proximity sensing glide head can enter a nano-defect detection or "active" mode. In the protruded position, the contact pad probes closer to the disc, past the plane of the advanced air bearing surface, where smaller, less destructive defects reside. The protrusion is generally on the order of a few micrometers wide, which further localizes any defects. Any number of heaters can be arrayed across trailing edge 33 of slider 24, or a single heater can be used to function as an audit level examination.

Although the present invention has been described with reference to preferred embodiments, workers skilled in the art will recognize that changes may be made in form and detail without departing from the spirit and scope of the invention. The implementations described above and other implementations are within the scope of the following claims.

The invention claimed is:

1. An apparatus for detecting surface variations in recordable magnetic media, the apparatus comprising:
   a slider body configured to fly over the recordable magnetic media, the slider body having a leading edge, a trailing edge, a trailing edge face and an air bearing surface;
   a suspension assembly coupled to the slider body configured to support the slider above the recordable magnetic media;
   a plurality of thermal proximity sensing elements connected in a bridge circuit, the plurality of thermal proximity sensing elements on the trailing edge face and adjacent to the air bearing surface; and
   a controller coupled to the thermal proximity sensing elements, the controller configured to receive signals from the plurality of thermal proximity sensing elements and determine the existence of a surface variation in the recordable magnetic media based upon differences in the signals received from the plurality of thermal proximity sensing elements.

2. The apparatus of claim 1 wherein the plurality of thermal proximity sensing elements are used to detect both macro-defects and nano-defects in the recordable magnetic media.

3. The apparatus of claim 1 wherein the plurality of thermal proximity sensing elements comprises four resistors connected by three contact pads.

4. The apparatus of claim 1 wherein the plurality of thermal proximity sensing elements allow for a differentiation between a change in an ambient temperature and a change in a temperature due to detection of a surface variation.

5. The apparatus of claim 1 further comprising:
   a pad attached to the slider body that defines in part the air bearing surface, wherein the plurality of thermal proximity sensing elements are located on a trailing edge of the pad.

6. The apparatus of claim 1 further comprising:
   a heating element for elevating the temperature of the thermal proximity sensing elements in relation to the temperature of the recordable magnetic media, the heating element mounted to the slider body.

7. The apparatus of claim 1 further comprising:
   a first rail attached to the slider body that defines in part the air bearing surface;
   a second rail attached to the slider body that defines in part the air bearing surface; and
   wherein the plurality of thermal proximity sensing elements are evenly distributed between the first rail and second rail.

8. The apparatus of claim 7 further comprising:
   a pad attached to the slider body between the first rail and the second rail, the pad defining in part the air bearing surface, wherein the plurality of thermal proximity sensing elements are located on a trailing edge of the pad.

9. The apparatus of claim 1 wherein the plurality of thermal proximity sensing elements determine the position of the surface variation.

10. The apparatus of claim 1 wherein the plurality of thermal proximity sensing elements comprises four resistors.

* * * * *